P. BRANDELL.
TROLLEY HEAD.
APPLICATION FILED APR. 23, 1910.
997,957.
Patented July 18, 1911.
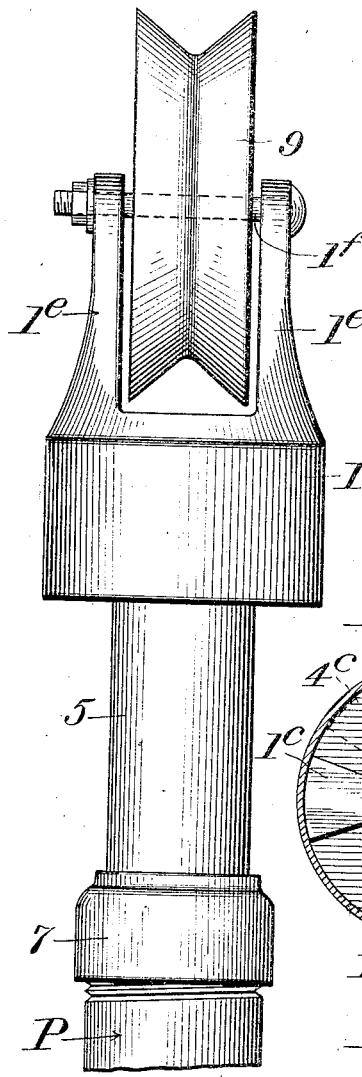
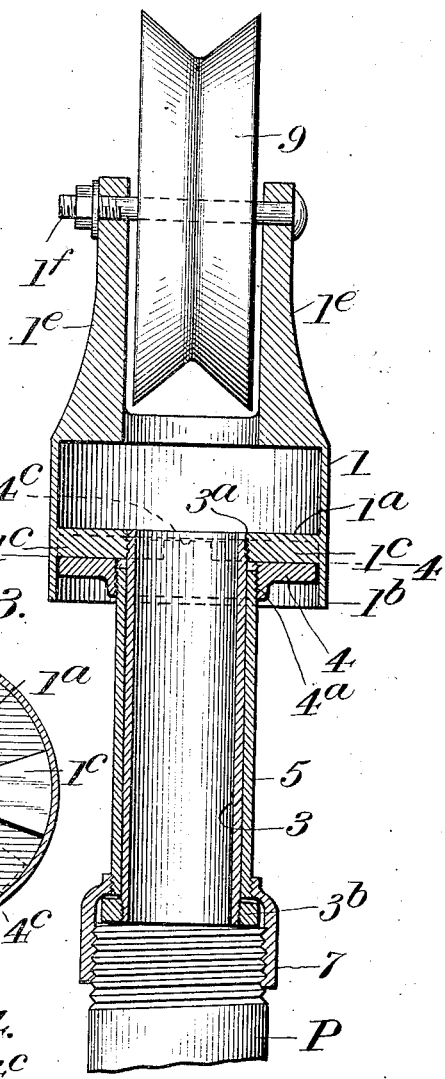
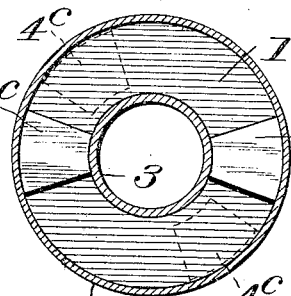
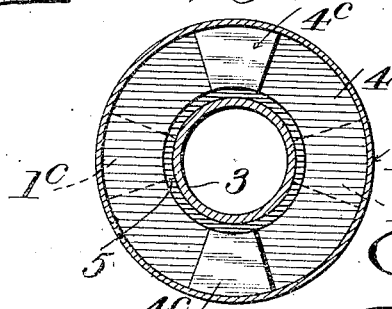
Inventor
Peter Brandell
By Alexander Lowell
Attorneys
Witnesses
C. H. Walker
James P. Mansfield

UNITED STATES PATENT OFFICE.

PETER BRANDELL, OF WICHITA, KANSAS.

TROLLEY-HEAD.

997,957.  Specification of Letters Patent.  Patented July 18, 1911.

Application filed April 23, 1910. Serial No. 557,254.

*To all whom it may concern:*

Be it known that I, PETER BRANDELL, residing at Wichita, in the county of Sedgwick and State of Kansas, have invented certain new and useful Improvements in Trolley-Heads; and I hereby declare that the following is a full, clear, and exact description thereof, reference being had to the accompanying drawings, which form part of this specification.

This invention relates to trolley heads and its objects are to mount the trolley wheel bearings on a semi-rotatable support so that said wheel shall be capable of limited lateral oscillation upon the pole, thereby enabling it to adjust itself to slight inequalities in the wire without jumping therefrom, and to so mount the wheel that the bearings thereof will be protected from rain, snow and ice; and also from dust.

The invention consists in the novel construction of the trolley wheel support and means for mounting same upon the trolley pole substantially as illustrated in the accompanying drawings and described and explained with reference thereto.

In the drawings—Figure 1 represents a front view of my novel trolley wheel support connected to a pole. Fig. 2 is a vertical longitudinal section therethrough. Fig. 3 is a section on the line 3—4 looking upward, showing the lugs on the under side of the trolley head. Fig. 4 is a transverse section on the line 3—4 looking downward, showing the lugs on the support.

The device, as shown, comprises a cap-piece 1 having a cylindric body, and provided on its upper end with opposite arms $1^e$ between which is mounted the shaft $1^f$ of the trolley wheel 9. The shaft and wheel may be of any desired construction. Said cap-piece 1 is provided with an internal transverse partition or head $1^a$ which is provided on its under side with, preferably diametrically opposite, lugs $1^c$; and the cylindrical portion of the cap-piece 1 extends below this flange $1^a$, forming a skirt-flange $1^b$ for a purpose hereinafter stated.

Connected centrally to the head $1^a$ is a shank member 3, which is preferably made of a section of pipe united to a central opening in the head by a threaded joint, as shown at $3^a$, or in any other suitable manner; and this shank fits freely within a tubular supporting member 5, which may also be a section of pipe slightly larger in diameter than the shank 3, and is provided on its upper end with an annular flange or bearing plate 4, which may be formed separately from the tubular member 5 and be secured thereto by a threaded joint as shown at $4^a$, or in any other convenient manner.

The bearing plate 4 is adapted to fit neatly within the flange $1^b$ of the cap-piece 1 and under the head $1^a$; and said bearing plate 4 has on its upper side, preferably diametrically opposite, lugs $4^c$ which are adapted to engage the under side of the head $1^a$ intermediate the lugs $1^c$. It will be seen that by this arrangement the lugs $1^c$, $4^c$, practically support the cap-piece upon the member 5 and at the same time limit the rotative movement of the cap-piece on the support 5, the amount of rotative movement of the cap-piece upon the support being regulated by the number and width of the lugs $1^c$, $4^c$; something over 90 degrees of rotative movement being allowed the cap-piece in the construction shown.

The tubular shank 3 is rotatably confined with the support 5 by any suitable means; as shown an annular nut $3^b$ is screwed on the lower end of the shank 3 which projects slightly beyond the lower end of the support 5. The support 5 is adapted to be attached to a trolley pole P in any suitable way; but as shown is provided on its lower end with an internally threaded nipple 7 which is fastened to the lower end of the support 5 and extends below and surrounds the nut $3^b$ and is internally threaded so that it can be screwed onto the upper threaded end of the trolley pole P—which can be cut to the desired length and threaded to engage the nipple 7, see Figs. 1 and 2. It will be seen that the bearing parts are entirely inclosed by the cap-piece 1, head $1^a$, bearing plate 4, and flange $1^b$, and are effectually protected from dust, rain, snow and ice; while the trolley wheel may at all times readily accommodate itself to slight lateral bends and in inequalities of the trolley wires as is desirable with high speed cars.

What I claim is:

A trolley head comprising a tubular support adapted to be attached to the end of a trolley pole and having an annular bearing plate on its upper end, said plate having opposite segmental shaped lugs on its upper face; a hollow cylindric body rotatably surrounding said bearing plate and projecting both above and below the same and having an internal partition above the bearing plate, said partition having opposite segmental shaped lugs on its under side alternating with those on the said bearing plate; said lugs supporting the body upon the bearing plate and also limiting the relative rotatory movement of said body and plate; a tubular shank extending through the said support and bearing plate and having its upper end fixedly attached to said partition, means on the lower end of said shank to confine it against longitudinal motion in the support while permitting its turning with the body; and a trolley wheel mounted on said body above the said partition, substantially as described.

In testimony that I claim the foregoing as my own, I affix my signature in presence of two witnesses.

PETER BRANDELL.

Witnesses:
H. M. RICKARDS,
W. F. McKONE.